United States Patent [19]

Fleming

[11] Patent Number: 5,392,389
[45] Date of Patent: Feb. 21, 1995

[54] GRAPHICAL METHOD FOR CREATING AN OBJECT

[75] Inventor: Stephen S. Fleming, Dallas, Tex.

[73] Assignee: International Business Machines Corporation, Armonk, N.Y.

[21] Appl. No.: 268,888

[22] Filed: Jun. 30, 1994

Related U.S. Application Data

[63] Continuation of Ser. No. 752,791, Aug. 30, 1991, abandoned.

[51] Int. Cl.⁶ ............................................. G06F 15/62
[52] U.S. Cl. .................................... 395/159; 395/157
[58] Field of Search .................. 395/155, 156, 157–161

[56] References Cited

U.S. PATENT DOCUMENTS

| | | | |
|---|---|---|---|
| 4,899,136 | 2/1990 | Beard et al. | 395/159 |
| 5,140,677 | 8/1992 | Fleming et al. | 395/159 |
| 5,140,678 | 8/1992 | Torres | 395/159 |

OTHER PUBLICATIONS

'ICON Technique For Multiple Object Views' Research Disclosure No. 312, Apr. 1990, Emsworth, GB. p. 307, No. 31228.

*Primary Examiner*—Mark R. Powell
*Assistant Examiner*—Huynh Ba
*Attorney, Agent, or Firm*—Jonathan E. Jobe; Andrew J. Dillon

[57] ABSTRACT

A method and system for creating objects in a computer system having a display screen and a device for manipulating objects on the screen. The method includes displaying an object dispenser icon on the screen and a dispensable object mini-icon on the object dispenser icon. Objects may be created by dragging dispensable object icons out of the object dispenser icon, or by opening the dispensable object mini-icon. The objects dispensed by the dispenser may be modified by opening the object dispenser icon or by "dropping" a modified object icon on the dispenser icon. The dispenser icon may be moved about the display screen.

6 Claims, 7 Drawing Sheets

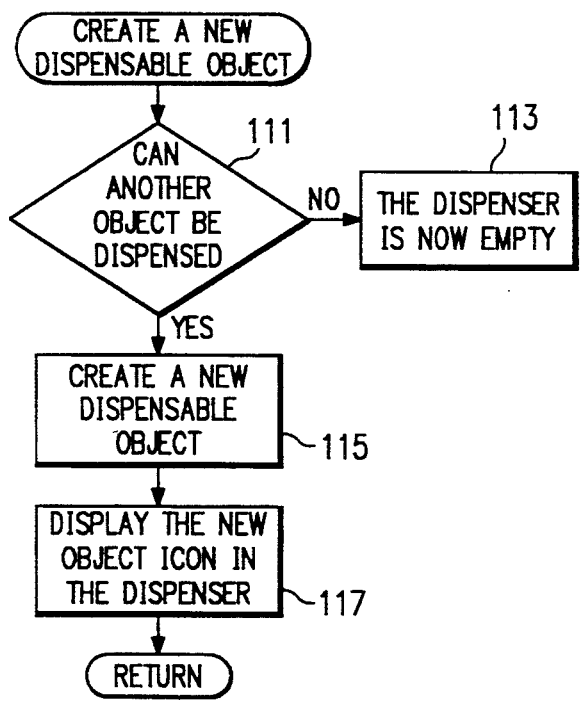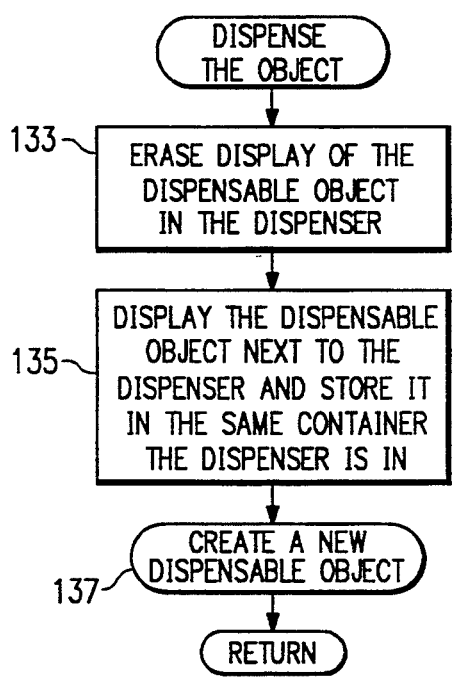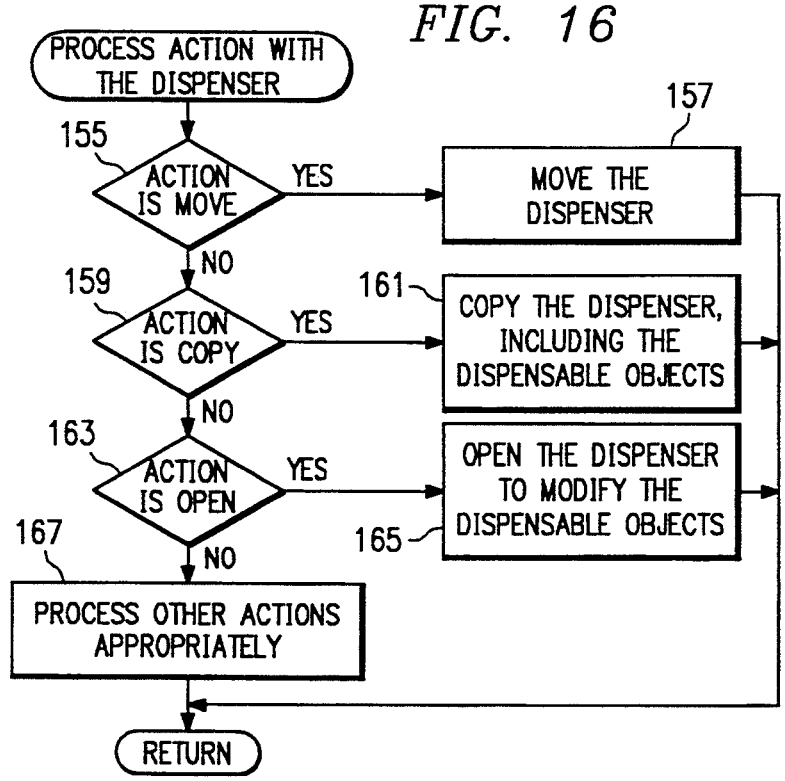

GRAPHICAL METHOD FOR CREATING AN OBJECT

This is a continuation, of application Ser. No. 07/752,791, filed Aug. 30, 1991, now abandoned.

BACKGROUND OF THE INVENTION

1. Field of the Invention

The present invention relates generally to computer systems with graphical user interfaces and more particularly to a system and graphical method for creating objects by direct manipulation and the open action.

2. Description of the Prior Art

Current systems provide for object creation from templates using the open action. For a template, the open action will create a new object and then open a window within which to manipulate the object. However, direct manipulation of the template may not be used for object creation in the general case because direct manipulation of the template is used to reposition the template within its container.

In many cases, it is desirable to create an object via direct manipulation. With creation via direct manipulation, the user has control over the location of the newly created object. Also, many times the user may not wish to open the object. In fact, within many applications, there may be objects such as geometric figures that can be created by direct manipulation but are only infrequently opened. Thus, some current systems provide for object creation via direct manipulation of templates. In those cases, the open action is not used to create the new object since this is how the template object itself is opened for modification. In these systems, templates cannot be repositioned, unless a special augmentation key is used during the direct manipulation.

In general, a trade-off results between supporting existing behaviors for direct manipulation plus the open action and the desire to provide a different behavior which results in object creation. Providing a different behavior makes templates useful for the purpose of creating new objects. However, removing support from normal object behaviors may cause confusion to the user. This trade-off is particularly evident when templates are placed on the user's electronic desk top. For objects that are frequently used, it is natural to place them on the desk top for convenient access. For example, if a user is frequently creating invoices, it would be natural for the user to place an invoice template on the desk top and "tear off" a new invoice from that template, as one would tear off a form from a pad of paper. The trade-off arises when the user wishes to reposition the template on desk top. In this case, normal direct manipulation cannot be used and templates behave inconsistently. Similarly, in systems where a template is opened to create a new object, a trade-off has been made since it is not possible to open the template to modify the template itself.

SUMMARY OF THE INVENTION

In the present invention, a new user metaphor referred to as an object dispenser is provided for the creation of objects. The object dispenser includes an object dispenser icon that is displayed on the screen and a dispensable object mini-icon that is displayed on the object dispenser icon. The object dispenser provides optimal support for object creation. Objects may be created via direct manipulation by directly manipulating the dispensable object. This matches the user metaphor for trays used to dispense business cards or notes, as well as the user metaphor for super market or parking ticket dispensers. This also matches the user metaphor for tearing off a form from a form pad. When the object is dispensed, animation during the direct manipulation operation shows the dispensable object mini-icon leaving the object dispenser icon and being replaced by a new dispensable object mini-icon available to be dispensed. Objects may also be created by opening the dispensable object mini-icon. This combines the creation action with the open action. Using animation, the created object is placed along side the object dispenser, as if it were directly manipulated. Then, the newly created object is opened.

The object dispenser of the present invention also supports normal operations on the dispenser. For example, the dispenser may be moved about the screen by directly manipulating the object dispenser icon. This matches the user metaphor for trays used to dispense business cards or pads used to dispense note papers and forms. In the same way that a person may move a real tray or notepad around a real desk, the user can move the object dispenser icon about the screen.

The user may also open the dispenser by pointing to the object dispenser icon. Opening the dispenser allows the user to modify the contents and properties of the objects being dispensed. Also, in the present invention, the content and properties of the objects being dispensed may be modified by direct manipulation. If an object is dropped on the object dispenser icon, the dispenser unit will then contain the object dropped on it and discard the old object that was dispensed. This behavior allows a dispenser to be easily created by copying an icon object and dropping on it the object the user wishes to have dispensed. It is even possible to create a dispenser for dispensers using this technique.

In the present invention, objects may be freely created by a direct manipulation or by the open action without losing normal object behaviors. The object in a dispenser may be modified in place or changed easily to another object. The user is provided with an effective metaphor corresponding to how new objects are obtained in the real world.

BRIEF DESCRIPTION OF THE DRAWINGS

FIG. 15 is a flow chart of the "CREATE A NEW DISPENSABLE OBJECT" routine of the present invention.

FIG. 16 is a flow chart of the "PROCESS ACTION WITH THE DISPENSER" routine of the present invention.

FIG. 17 is a flow chart of the "DISPENSE THE OBJECT" routine of the present invention.

DESCRIPTION OF THE PREFERRED EMBODIMENT

Figure 1:
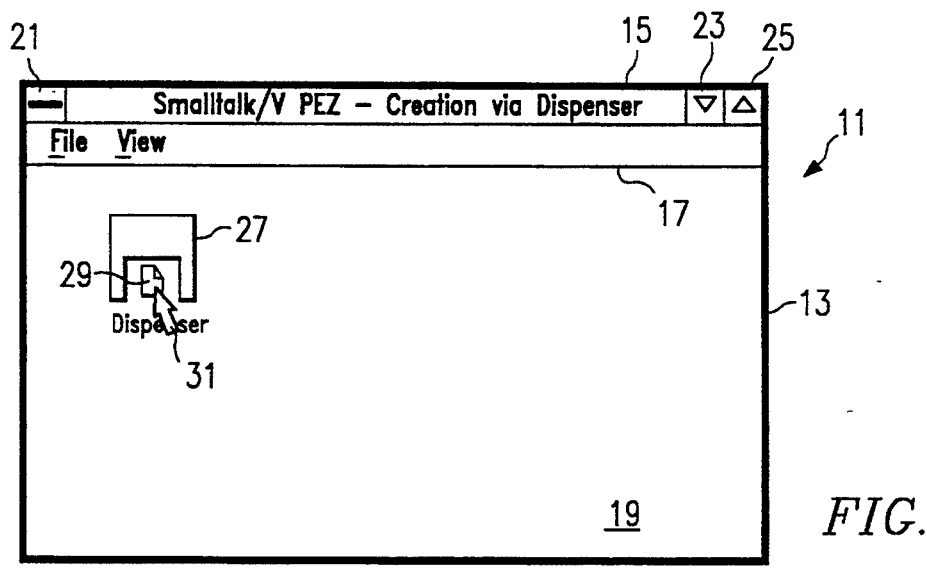
FIGS. 1-3 are sequential pictorial views showing the creation of an object via direct manipulation according to the present invention.

Referring now to the drawings, and first to FIG. 1, a window is designated generally by the numeral 11. Window 11 is displayed on a computer display screen (not shown) in a manner well known to those skilled in the art. Window 11 includes a window border 13, a title bar 15, an action bar 17, and a client area 19. Title bar 15 includes, in addition to the title of the window, a system menu icon 21 and sizing icons 23 and 25. System menu icon 21 allows a user to display a pull-down menu containing the actions that the user can perform on the window. Window sizing icon 23 provides a fast way to use a mouse or other pointing device to minimize the window by reducing it to an icon. Conversely, window-sizing icon 25 provides a fast way for the user to maximize the window to fill the entire screen. Action bar 17 contains a list of the actions of an application. The user can cause the system to display a pull-down menu under each item in action bar 17.

Client area 19 comprises the remainder of window 11. Client area 19 is the focus of the user's attention and it is where the user is presented with the object or objects upon which the user wishes to work.

Displayed in client area 19 is an object dispenser icon 27. Object dispenser icon 27 includes a dispensable object mini-icon 29, which represents a document object. A pointer 31 is shown in FIG. 1 pointing to dispensable object mini-icon 29. Pointer 31 is moveable about the screen by means of a mouse (not shown) as is well known to those skilled in the art. The user may operate pointer 31 to select or move items on the screen.

Figure 2:
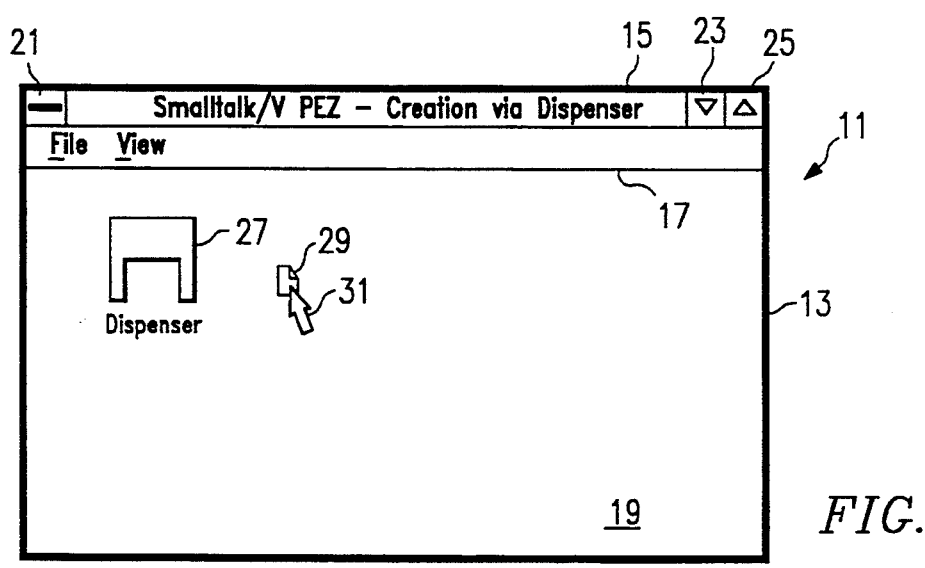
Figure 3:
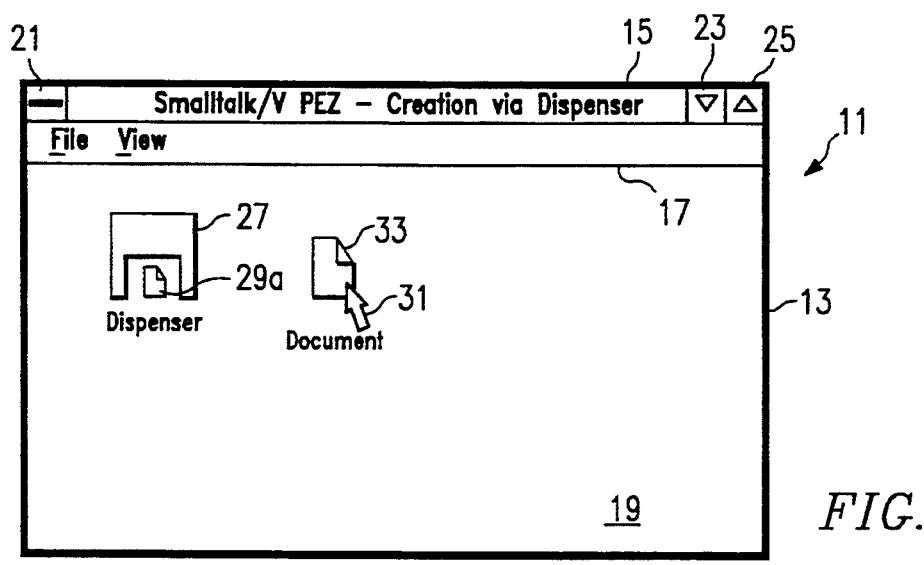

Object dispenser icon 27 of the present invention allows a user to create objects by direct manipulation. As shown sequentially in FIGS. 1–3, the user may create a document object by dragging dispensable object mini-icon 29 out of object dispenser icon 27 and dropping dispensable object mini-icon 29 at another location in window client area 19. As those skilled in the art recognize, dragging is accomplished by placing mouse pointer 31 on dispensable object mini-icon 29, pressing one of the buttons on the mouse, and moving pointer 31 about the screen with the button pressed. When the user releases the mouse button, the dragged dispensable object mini-icon 29 is dropped at the location of the pointer. In the present invention, when dispensable object mini-icon is dropped, it is replaced by a full size document icon 33 and a new dispensable object mini-icon 29a is displayed in object dispenser icon 27. The user can then open document icon 33 in the manner well known to those skilled in the art and work with its contents.

Figure 4:
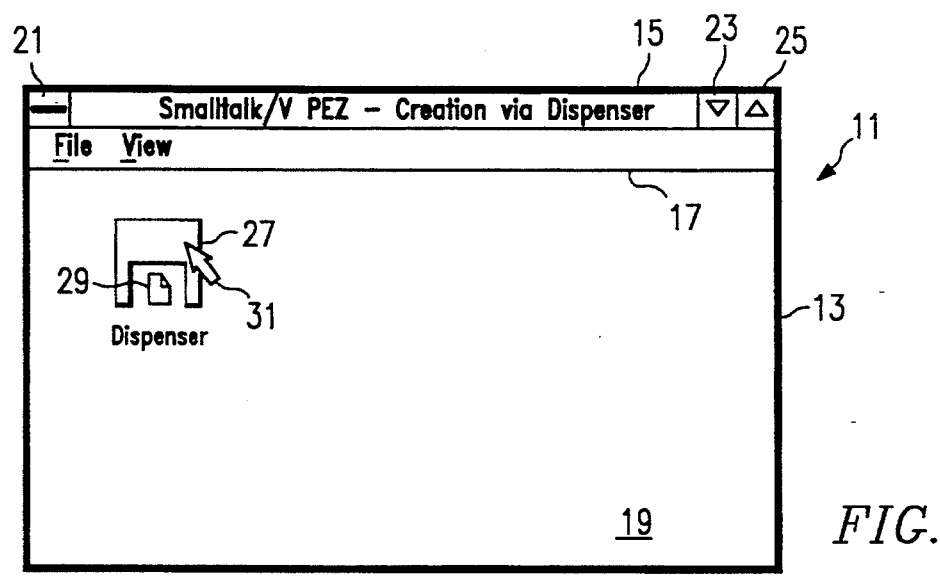
FIGS. 4-6 are sequential pictorial views showing the movement of the object dispenser icon and dispensable object mini-icon around a window.
Figure 5:
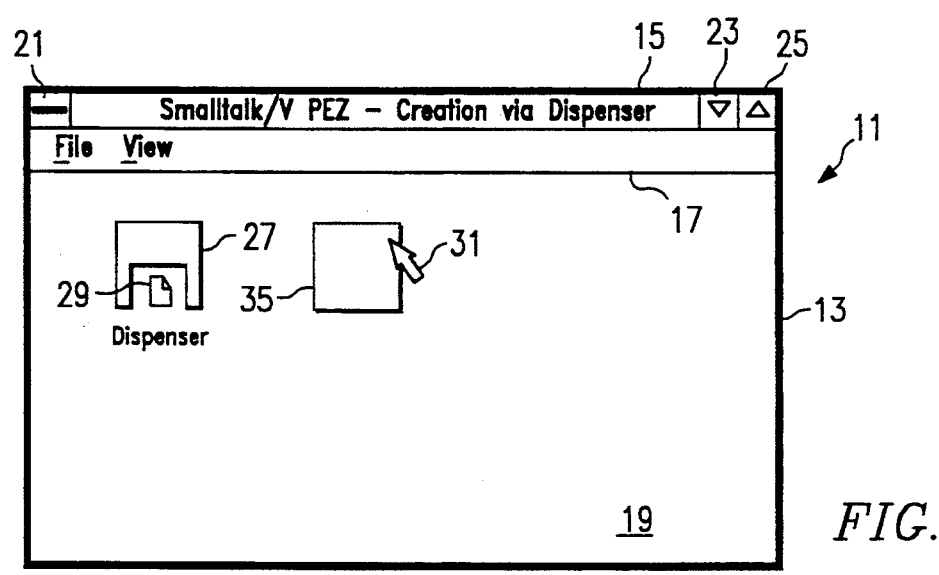
Figure 6:
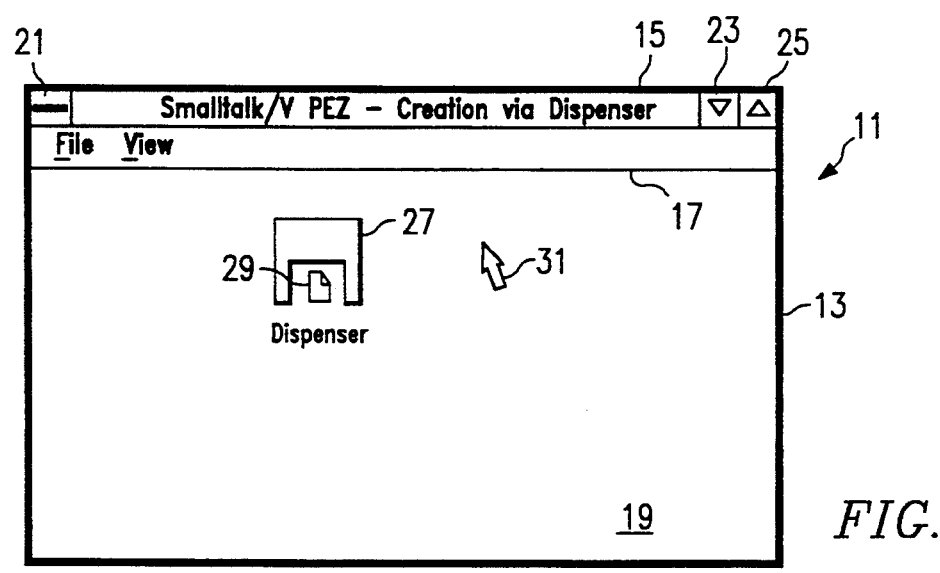

Referring now to FIGS. 4–6, object dispenser icon 27 may be moved about client area 19 in the normal manner by means of mouse pointer 31. To move object dispenser icon 27, the user places pointer 31 on dispenser icon 27, rather than dispensable object icon 29, presses one of the mouse buttons, and moves pointer 31 with the button pressed. As shown in FIG. 5, as long as the mouse button remains pressed, dispenser icon 27 remains at its original position while a box 35 with pointer 31 attached to it moves about the client area 19. As shown in FIG. 6, after the mouse button has been released, object dispenser icon 27 is redisplayed at a new location in client area 19.

Figure 7:
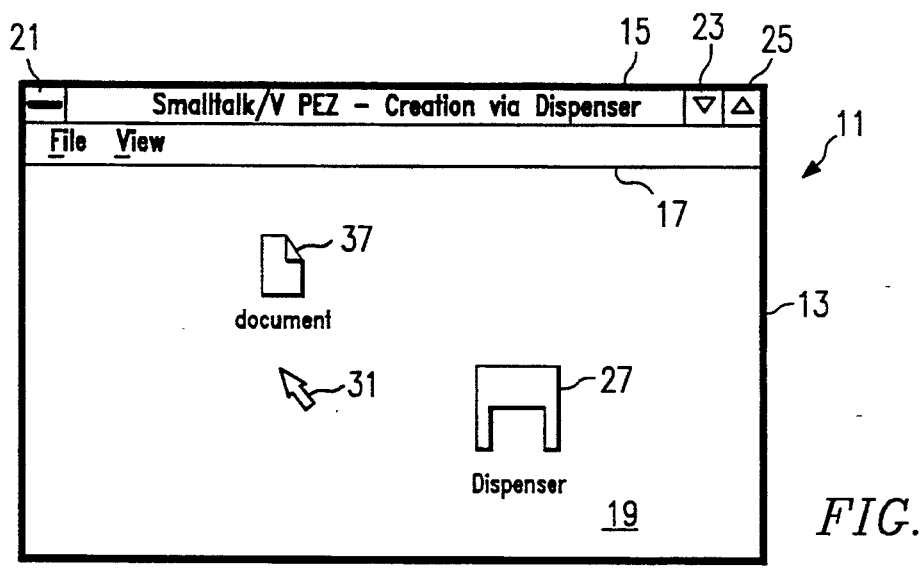
FIGS. 7-9 are sequential pictorial views showing the creation of a dispensable object via direct manipulation according to the present invention.
Figure 8:
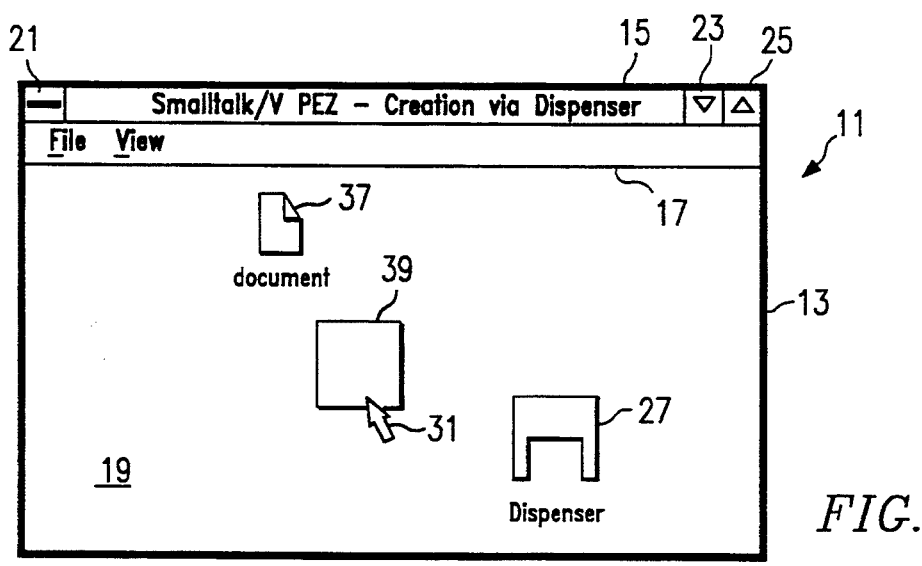
Figure 9:
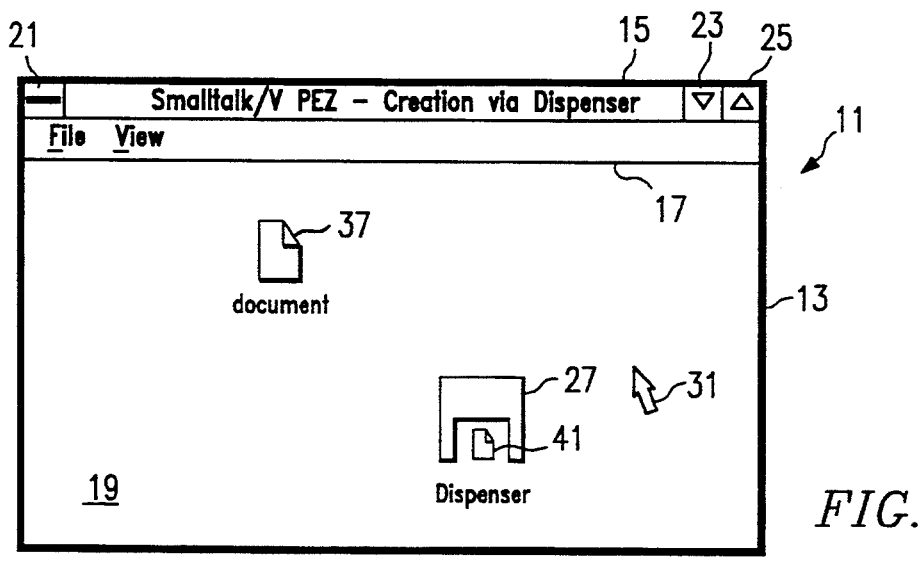

Referring now to FIGS. 7–9, a user may create a dispensable object by direct manipulation. Referring to FIG. 7, an empty dispenser icon 27 is displayed in window client area 19. Also displayed in client area 19 is a document icon 37. If the user desires to use the document object represented by document icon 37 as a form for similar documents, he may do so by dropping document icon 37 on dispenser icon 27. More specifically, the user may place pointer 31 on document icon 37, press one of the mouse buttons, and move pointer 31, with the mouse button pressed, to dispenser object 27. As shown in FIG. 8, as the pointer 31 is moved from document icon 37 to dispenser icon 27 with the mouse button depressed, a box 39 is attached to pointer 31. When pointer 31 reaches dispenser icon 27 and the mouse button is released, a dispensable object mini-icon 41 is displayed in dispenser icon 27, as shown in FIG. 9. In accordance with the present invention, the user may then dispense multiple identical copies of document 37. As will be explained in greater detail later, an object icon may be dropped on a dispenser icon that already has a dispensable object icon in it. In that case, the object represented by the dispensable object mini-icon would be replaced by the object represented by the dragged icon.

Figure 10:
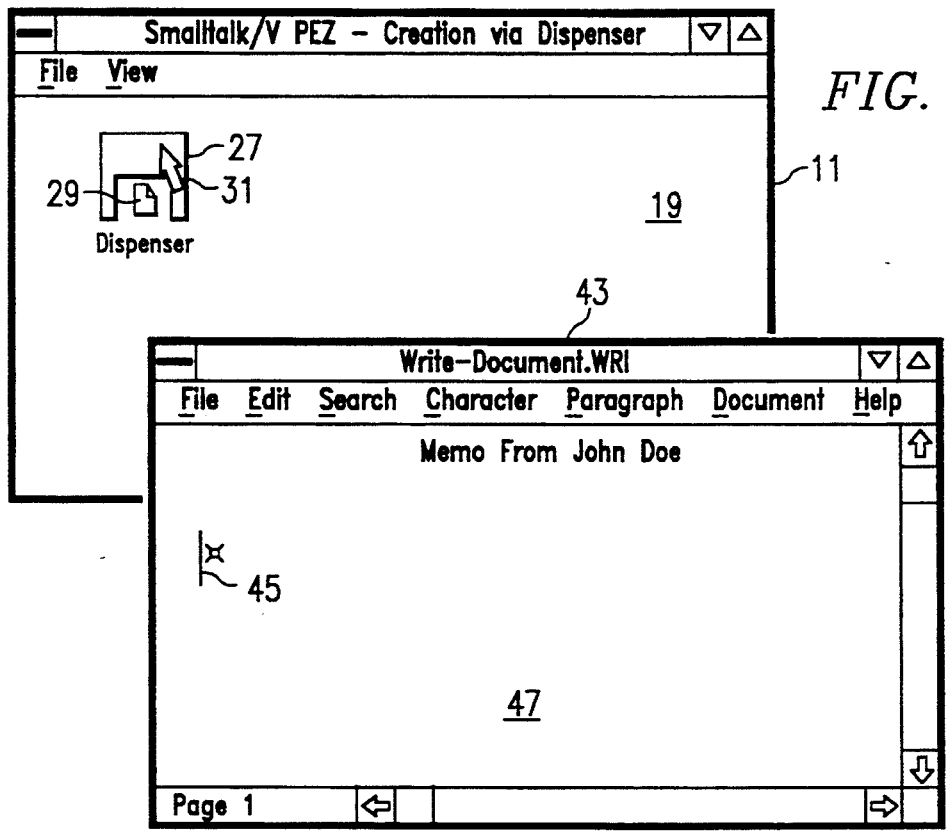
FIG. 10 is a pictorial view showing the modification of a dispensable object according to the present invention.
Figure 11:
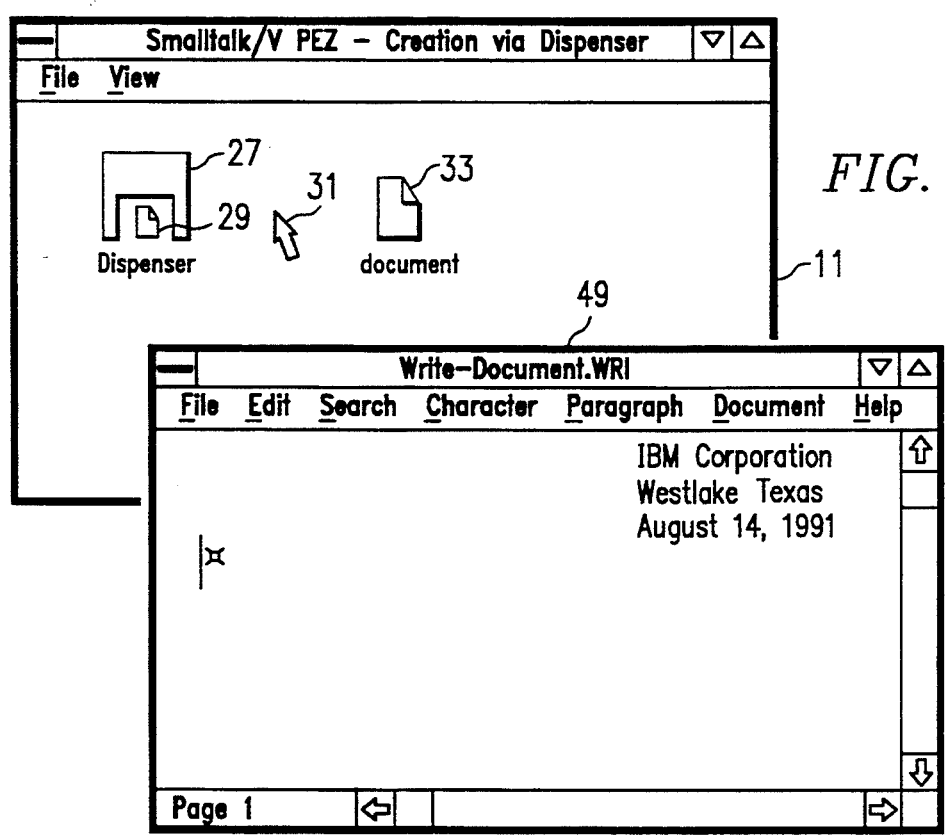
FIG. 11 is a pictorial view showing a dispensable object window.

Referring now to FIG. 10, the contents of the object dispensed by dispenser icon 27 may also be modified by opening dispenser icon 27. In the preferred embodiment, an icon is opened by pointing to the icon with the pointer and double clicking one of the mouse buttons. In FIG. 10, double clicking on dispenser icon 27 opens a window 43 for the object represented by dispensable object mini-icon 29. Window 43 is similar to window 11 in that it includes a title bar, action bar and a client area. However, since it is a document window, a typing cursor 45 is displayed in its client area 47. The user can enter textual material into window 43 by means of a keyboard (not shown). When the user is finished entering data into window 43, he may close window 43, whereupon the object represented by dispensable object icon 29 is modified. Similarly, referring to FIG. 11, the user can dispense an object by opening dispensable object mini-icon 29. When the user opens dispensable object mini-icon 29, a window 49 that contains the dispensable object appears.

Figure 12:
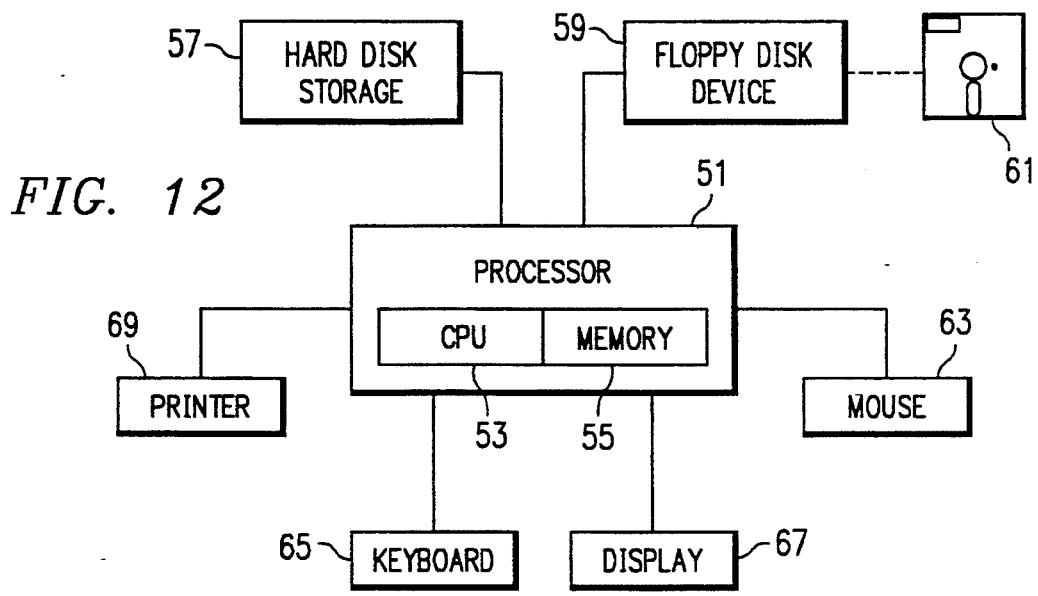
FIG. 12 is a block diagram of a system according to present invention.

Referring now to FIG. 12, there is shown, in block diagram form, a data processing system according to the present invention. The system includes a processor 51, which includes a central processing unit (CPU) 53 and a memory 55. Additional memory, in the form of a hard disk storage 57 and a floppy disk device 59, is connected to the processor. Floppy disk device 59 receives a floppy disk 61. Floppy disk 61 has computer program code recorded thereon that implements the present invention in the system. The system includes user interface hardware, including a mouse 63 and keyboard 65 for allowing user input to processor 51 and a display 67 for presenting visual data to the user. The system may include a printer 69.

Figure 13:
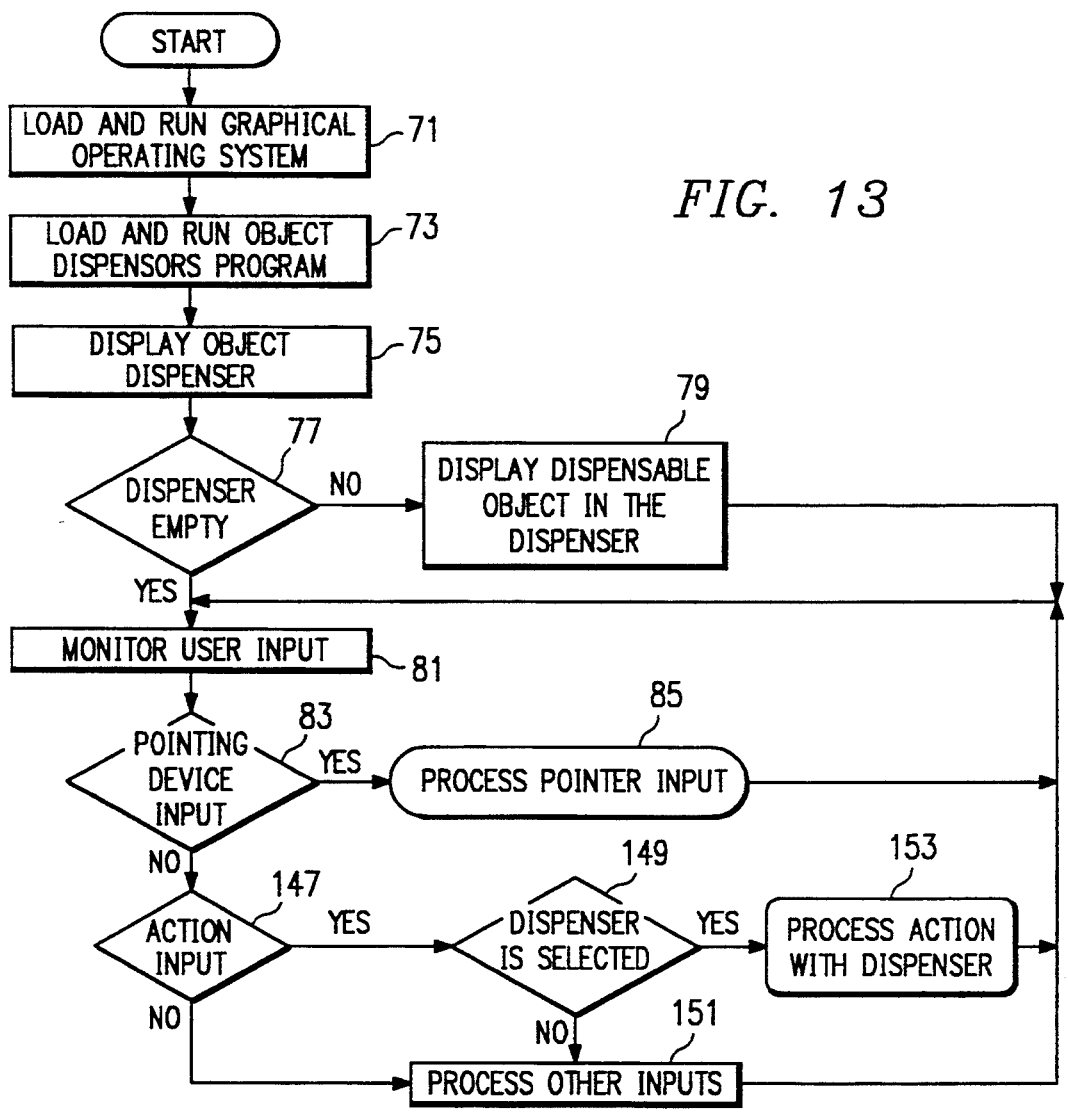
FIG. 13 is a flow chart of a preferred software implementation of the method of the present invention.

Referring now to FIG. 13, there is shown a flow chart of a preferred software implementation of the method of the present invention. First, at block 71, the system loads and runs a graphical operating system, which in the preferred embodiment is IBM OS/2 Presentation Manager. Then, at block 73, the system loads and runs the object dispensers program and, at block 74, displays the object dispenser icon. At decision block 77, the system tests whether or not the object dispenser icon is empty. If not, the system displays the dispensable object mini-icon in the dispenser at block 79. Then, the system monitors user input at block 81.

When the system receives user input, the system tests at decision block 83 whether or not the input is a pointing device input. If it is, the system executes the "PROCESS POINTER INPUT" routine shown generally at block 85, and shown in greater detail in FIG. 14.

Figure 14:
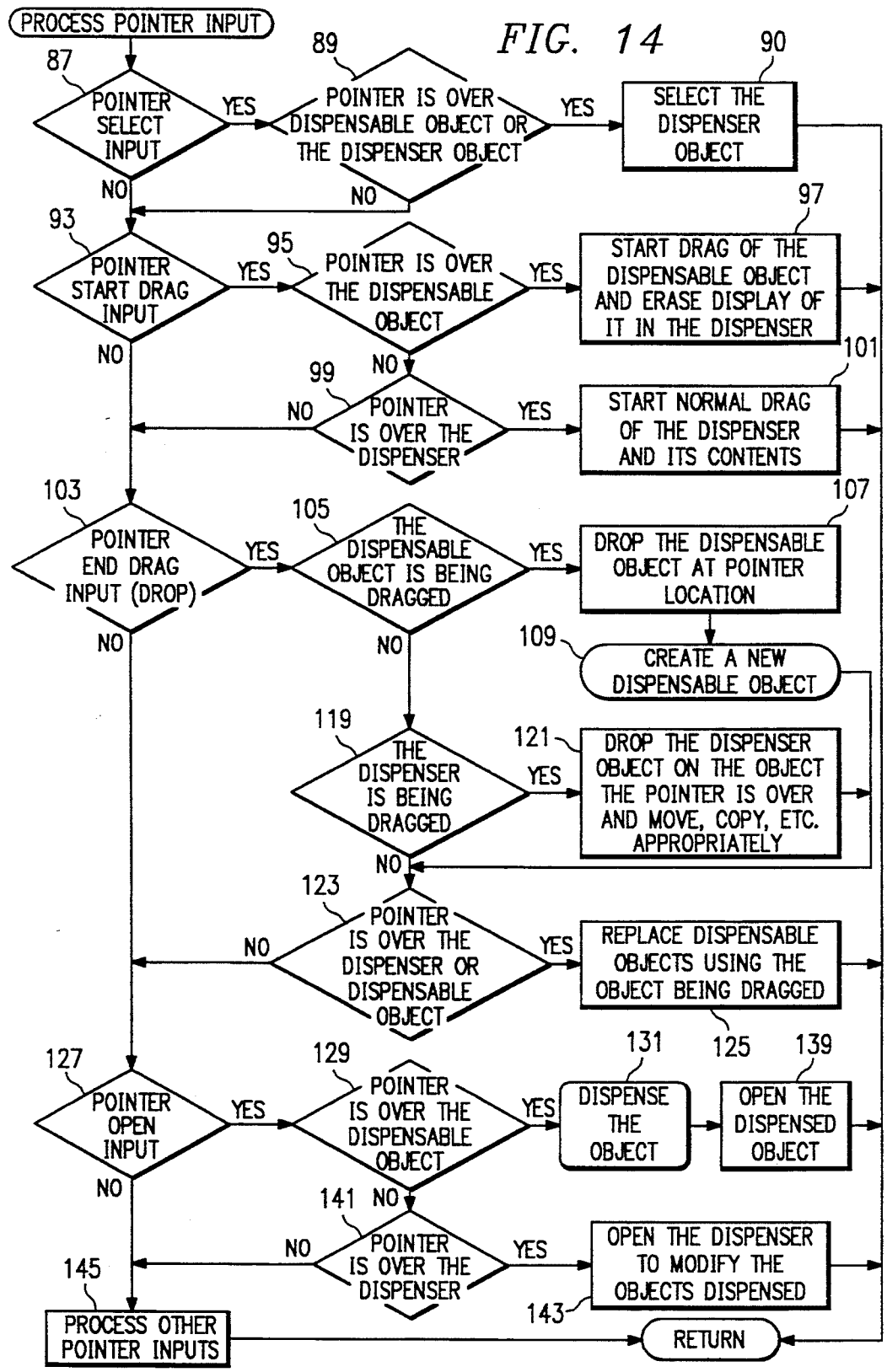
FIG. 14 is a flow chart showing details of the "PROCESS POINTER INPUT" routine of the present invention.

Referring to FIG. 14, in the process pointer input routine, the system first tests whether or not the pointer input is a "select", at decision block 87. In the preferred embodiment, a pointer select input is a single click of mouse button number 1. If the pointer input is a select, then the system tests at decision block 89 whether the pointer is over the dispensable object icon or the dispenser icon. If it is over one of them, the system selects the dispenser icon at block 90 and returns to block 81 of FIG. 13 to continue monitoring user input.

Referring still to FIG. 14, if, at decision block 87, the input is not a pointer select, then the system test at decision block 93 whether the input is a "pointer start drag" input. In the preferred embodiment, a pointer start drag input occurs when mouse button number 2 is pressed, rather than clicked, and the pointer is moved. If the input is a pointer start drag, the system tests at decision block 95 whether the pointer is over the dispensable object mini-icon. If it is, the system starts the drag of the dispensable object and erases the display of the dispensable object mini-icon in the dispenser icon, at block 97 and returns to block 81 of FIG. 13. If, at decision block 95, the pointer is not over the dispensable object icon, then the system tests, at decision block 99, whether the pointer is over the dispenser. If it is, the system, at block 101, starts the normal drag of the dispenser and its contents and returns to block 81 of FIG. 13 to continue monitoring user input.

Referring still to FIG. 14, if, at decision block 93, the user input is not a "start pointer drag", the system tests at decision block 103 whether or not the user input is a "pointer end drag" or "drop" input. If it is, the system tests, at decision block 105 whether the object being dragged is a dispensable object icon. If it is, the system, at block 107 drops the dispensable object icon at the location of the pointer and, as generally indicated at block 109, creates a new dispensable object.

Referring to FIG. 15, which shows a flow chart of an implementation of the "CREATE A NEW DISPENSABLE OBJECT" routine of the present invention, the system tests at decision block 111 whether or not another object can be dispensed. For example, the system may include a counter that limits the number of dispensable objects that can be dispensed. If another object cannot be dispensed, then the dispenser is empty, as shown at block 113, and a dispensable object is not redisplayed in the dispenser. If, on the other hand, another object can be dispensed, the system, at block 115 creates a new dispensable object and, at block 117, displays a new object icon in the dispenser. Then, the system returns.

Referring again to FIG. 14, if, at decision block 105, the object being dragged is not a dispensable object icon, the system tests, at decision block 119, whether the dispenser icon is being dragged. If it is, the dispenser object is dropped at the location of the pointer and the appropriate action is performed at block 121 and the system returns. If at decision blocks 105 and 119 the object being dragged is neither a dispensable object nor the dispenser icon, the system tests at decision block 123 whether the pointer is over the dispenser icon or the dispensable object icon. If it is, then, at block 125, the system replaces the dispensable object with the object being dragged and the system returns to block 81 of FIG. 13 and continues to monitor user input.

Still referring to FIG. 14, the system tests, at decision block 127, whether the pointer input is an "open" input. In the preferred embodiment, an open input consists of a double click of mouse button one. If the pointer input is open, the system tests at decision block 129 whether the pointer is over the dispensable object. If it is, then the system, as shown generally at block 131, dispenses the object.

Referring to FIG. 17, in the "DISPENSE THE OBJECT" routine of the present invention, the system, at block 133, erases the display of the dispensable object in the dispenser, and, at block 135, displays a dispensable object full size icon next to the dispenser and stores the object in the same container as the dispenser is in. Then, as shown generally at block 137, the system invokes the "CREATE A NEW DISPENSABLE OBJECT" routine which was described in detail in FIG. 15.

Referring again to FIG. 14, after the object has been dispensed at block 131, the system opens the dispensed object at block 139 and returns to block 81 of FIG. 13 to continue monitoring user input.

Referring still to FIG. 14, if at decision block 129, the pointer is not over the dispensable object, the system tests, at decision block 141, whether the pointer is over the dispenser icon. If it is, the system, at block 143, opens the dispenser to enable the user to modify the dispensed object and returns. If, at decision block 127, the pointer input is not an open input, the system, at block 145 processes other pointer inputs and returns.

Referring again to FIG. 13, if, at decision block 83, the user input is not a pointing device input, the system tests at decision block 147 whether or not the user input is an action input. An action input is an action that is initiated from an action bar pulled-down menu. If the input is an action input, the system tests at decision block 149 whether or not the dispenser is selected. If it is not, the system processes other inputs at block 151 and returns to block 81 to continue monitoring user input. If, on the other hand, the dispenser is selected, then the system processes the selected action with the dispenser, as indicated generally at block 153.

Referring to FIG. 16, which shows details of the "PROCESS ACTION WITH THE DISPENSER" routine of the present invention, the system tests at decision block 155 whether or not the action is a move. If it is, the system, at block 157 moves the dispenser and returns. If the action is not a move, then the system tests at decision block 159 whether or not the action is a copy. If it is, the system, at block 161, copies the dispenser, including the dispensable objects, and returns. If, at decision block 159 the action is not a copy, then the system tests at decision block 163 whether the action is an open. If it is, the system opens the dispenser at block 165 to enable the user to modify the dispensable object and returns. Finally, if the action is neither a move, copy, nor open, the system processes other actions appropriately at block 167 and returns.

From the foregoing, it may be seen that the present invention allows a user to create and modify objects easily and in an intuitive way. While the invention has been particularly shown and described with reference to a preferred embodiment, those skilled in the art will understand that various changes may be made in form and detail without departing from the spirit and scope of the invention.

What is claimed is:

1. A graphical method of creating an object in a computer system having a display screen and means for manipulating objects on said display screen, which comprises the steps of:

displaying an object dispenser icon on said screen;

dropping a dispensable object icon representative of a single identified object on said object dispenser icon;

displaying a dispensable object mini-icon on said object dispenser icon;

dragging said dispensable object mini-icon to another location on said display screen;

automatically replacing said dragged dispensable object mini-icon with a dispensable object icon in response to dropping of said dragged dispensable object mini-icon; and displaying said dispensable object mini-icon on said object dispenser icon in response to dropping of said dragged dispensable mini-icon wherein multiple copies of said dispensable object icon may be graphically created.

2. The method as claimed in claim 1, including the steps of:

opening said dispensable object icon; and automatically displaying a window having contents represented by said dispensable object icon.

3. The method as claimed in claim 2, including the steps of:

modifying the contents of said window represented by said dispensable object icon.

4. The method as claimed in claim 1, including the steps of:

opening said object dispenser icon;

automatically displaying a window represented by said dispensable object mini-icon; and, revising the object represented by said dispensable object mini-icon.

5. The method as claimed in claim 4, including the steps of:

closing said window.

6. The method as claimed in claim 5, including the steps of:

dispensing a dispensable object icon from said object dispenser, said dispensable object icon representing the revised object.

* * * * *